United States Patent [19]

Nagasawa et al.

[11] 4,412,125
[45] Oct. 25, 1983

[54] HEAT-SHRINKABLE COVER

[75] Inventors: Toshio Nagasawa; Yoshio Nishihara, both of Kyoto, Japan

[73] Assignee: Ube Industries, Ltd., Tokyo, Japan

[21] Appl. No.: 424,092

[22] Filed: Sep. 27, 1982

Related U.S. Application Data

[62] Division of Ser. No. 177,447, Aug. 11, 1980, Pat. No. 4,370,548.

[30] Foreign Application Priority Data

Aug. 14, 1979 [JP] Japan .............................. 54-102792

[51] Int. Cl.³ .................... H05B 3/36; H05B 3/10
[52] U.S. Cl. .................... 219/549; 174/DIG. 8; 174/117 R; 219/345; 219/528; 219/535; 219/544; 338/297; 428/36
[58] Field of Search .............. 219/203, 345, 505, 528, 219/535, 541, 544, 548, 549, 553; 338/245, 254, 255, 263, 287, 293, 297, 301; 174/117 R, 117 F, 117 FF, DIG. 8; 204/159.17; 428/36, 129, 913; 138/155, 156; 264/230; 285/381

[56] References Cited

U.S. PATENT DOCUMENTS

| | | | |
|---|---|---|---|
| 2,368,771 | 2/1945 | Osterheld | 338/245 |
| 2,585,443 | 2/1952 | Cox | 219/549 X |
| 2,712,591 | 7/1955 | Rogell | 338/255 X |
| 3,168,617 | 2/1965 | Richter | 174/117 R |
| 3,204,084 | 8/1965 | Spencer, Jr. et al. | 219/549 X |
| 3,491,800 | 1/1970 | Holtor | 138/155 |
| 3,503,101 | 3/1970 | Kolozsvary | 24/204 |
| 3,584,198 | 6/1971 | Doi et al. | 219/549 |
| 3,717,746 | 2/1973 | Breitweiser | 219/535 |
| 4,085,286 | 4/1978 | Horsma | 428/913 |
| 4,117,188 | 9/1978 | Takahashi et al. | 428/129 |
| 4,177,378 | 12/1979 | Horsma et al. | 174/DIG. 8 |
| 4,188,276 | 2/1980 | Lyons et al. | 204/159.17 |
| 4,219,928 | 9/1980 | Kuo | 174/117 FF X |
| 4,272,673 | 6/1981 | Semanez et al. | 219/544 |
| 4,369,356 | 1/1983 | Tsurutani et al. | 428/36 X |
| 4,370,548 | 1/1983 | Nagasawa et al. | 219/549 |

*Primary Examiner*—Volodymyr Y. Mayewsky
*Attorney, Agent, or Firm*—Burgess, Ryan & Wayne

[57] ABSTRACT

An electrical heating element material of a sheet form is provided, which is comprised of a web of a synthetic resin having a plurality of metal conductor wires arranged therein in parallel to one another along the longitudinal direction of the web. The web is folded in succession at predetermined intervals along folding lines inclined at a small acute angle to the transverse direction of the web to form a substantially two-layer parallelogrammatic sheet. Considering the small angle, the sheet is, for practical purposes, rectangular. The electrical heating element material is prepared by supplying a plurality of metal conductor wires arranged in parallel to one another into a cross-head type extrusion die, separately supplying a thermoplastic resin into said die, co-extruding the resin together with the wires to form a web, folding the web in succession at predetermined intervals along folding lines inclined at an acute angle to the transverse direction of the web to form the two-layer rectangular sheet, and then, optionally, bonding together the two layers. The electrical heating element material may be used as a heat-shrinkable cover, which is comprised of a heat-shrinkable synthetic resin member and the electrical heating element material combined with the heat-shrinkable resin member substantially over the entire region thereof.

13 Claims, 6 Drawing Figures

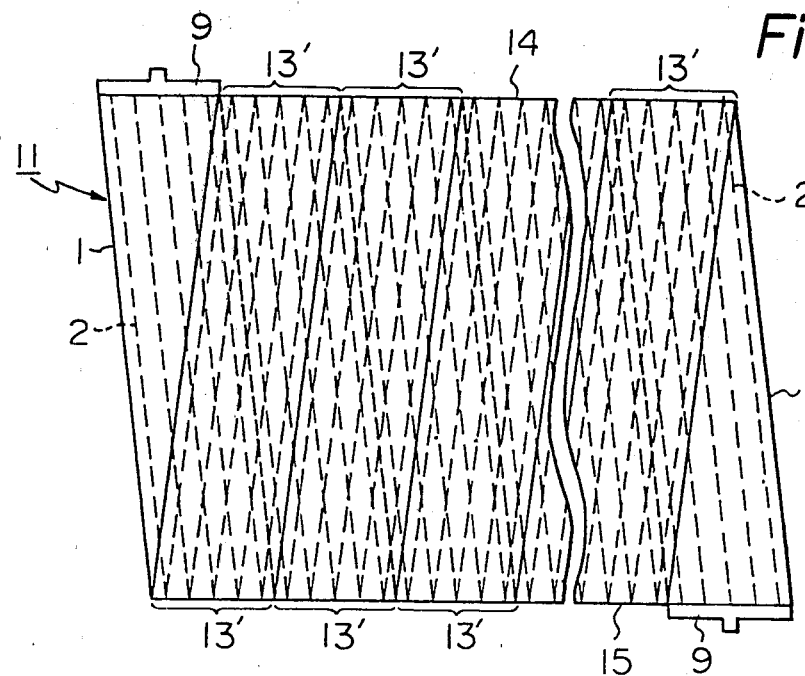
Fig. 4
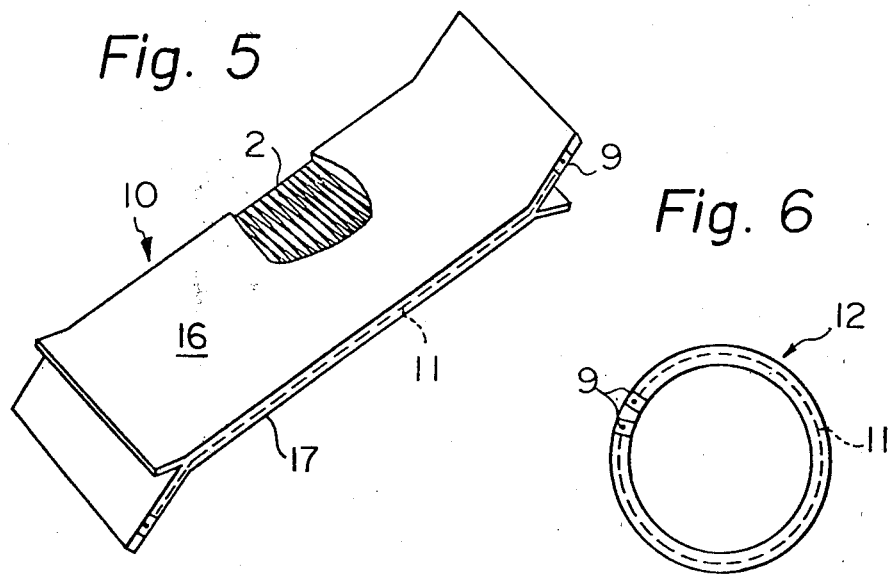
Fig. 5
Fig. 6

HEAT-SHRINKABLE COVER

This is a division of application Ser. No. 177,447, filed Aug. 11, 1980, now U.S. Pat. No. 4,370,548.

BACKGROUND OF THE INVENTION

(1) Field of the Invention

This invention relates to an electrical heating element material of a sheet form which comprises a synthetic resin matrix having metal conductor wires arranged therein and to a process for preparing the electrical heating element material. It also relates to a heat-shrinkable synthetic resin cover including this electrical heating element material therein.

(2) Description of the Prior Art

Tubular or flat sheet-shaped heat-shrinkable synthetic resin covers have heretofore been used as anticorrosive coverings of joints of steel pipes for pipelines or as protective coverings of joints of electric cables. More specifically, a tubular heat-shrinkable cover is placed around the joint, or a flat sheet-shaped heat-shrinkable cover is wound around the joint and the ends thereof are joined together, and the heat-shrinkable cover is shrunk under heating from an appropriate external heat source to form a coating tightly covering the joint. According to the conventional method, shrinkage under heating is accomplished by direct contact with flames while using a gas burner or the like. In this heat-shrinking method, great technical skill is required for formation of coatings, and under violent climatic conditions, for example, when it is extremely cold or there is a strong wind, this heat-shrinking operation is very troublesome and difficult, and it is impossible to attain a substantially uniform and sufficient heating effect. Therefore, it is impossible to form a sufficiently anticorrosive or protective coating or covering on the above-mentioned joint.

As means for moderating the above-mentioned defects of the conventional heat-shrinkable covers of the external heating type, there can be considered a method in which an electrical heating element is built in the interior of a heat-shrinkable cover. In this heat-shrinkable cover, when it is located around the joint and shrunk under heating, since external heating using a heat source such as a burner or a heat ray generator need not be carried out, it is expected that heat-shrinking of this cover can be accomplished irrespectively of climate conditions.

In the heat-shrinkable cover including the electrical heating element, this heating element is required to heat the entire cover uniformly while not substantially degrading the heat shrinkability of the cover. Furthermore, this heating element should be manufactured with ease on an industrial scale, and it should be possible to place the heating element in the cover simply and easily to facilitate the manufacture of the heat-shrinkable cover.

SUMMARY OF THE INVENTION

It is, therefore, an object of the present invention to provide an electrical heating element material of a sheet form having metal conductor wires arranged therein, the whole of which can be uniformly heated without substantial influence upon the heat shrinkability.

It is another object of the present invention to provide a process for preparing the above-mentioned electrical heating element material of a sheet-form having metal conductor wires arranged therein, wherein the metal conductor wires can be easily arranged in a synthetic resin matrix of the heating element material.

Other objects and advantages of the present invention will be apparent from the following description.

In one aspect of the present invention, there is provided an electrical heating element material of a sheet form comprising a web of a synthetic resin having a plurality of metal conductor wires arranged therein, in parallel to one another, along the longitudinal direction of the web, said web being folded in succession at predetermined intervals along folding lines inclined at a small acute angle to the transverse direction of the web to form an essentially two-layer rectangular sheet.

In another aspect of the present invention, there is provided a process for preparing an electrical heating element material of a sheet form comprising a web of a synthetic resin having a plurality of metal conductor wires arranged therein, which process comprises supplying a plurality of metal conductor wires arranged in parallel to one another into a cross-head type die for extrusion, separately supplying a thermoplastic resin into said die, co-extruding the thermoplastic resin together with the metal conductor wires to form a web having the metal conductor wires arranged therein, folding the web in succession at predetermined intervals along folding lines inclined at a small acute angle to the transverse direction of the web to form an essentially two-layer rectangular sheet, and, optionally, bonding together the two layers of the resulting sheet.

In still another aspect of the present invention, there is provided a heat-shrinkable cover comprising a heat-shrinkable synthetic resin member and an electrical heating element material combined with the heat-shrinkable resin member substantially over the entire region thereof wherein the electrical heating element material comprises a web of a synthetic resin having a plurality of metal conductor wires arranged therein in parallel to one another along the longitudinal direction of the web, said web being folded in succession at predetermined intervals along folding lines inclined at a small acute angle to the transverse direction of the web to form an essentially two-layer rectangular sheet, and the direction of the folding lines forming the side edges of the two-layer rectangular sheet of the electrical heating element material is substantially in agreement with the direction of heat shrinkage of the heat-shrinkable synthetic resin member.

BRIEF DESCRIPTION OF THE DRAWINGS

FIG. 4 is a top plan view showing an embodiment of the electrical heating element material according to the present invention;

FIG. 5 is a perspective view partially schematically showing an embodiment of the sheet-shaped heat-shrinkable cover according to the present invention; and FIG. 6 is an end view partially schematically illustrating an embodiment of the tubular heat-shrinkable cover according to the present invention.

DESCRIPTION OF THE PREFERRED EMBODIMENTS

Figure 1:
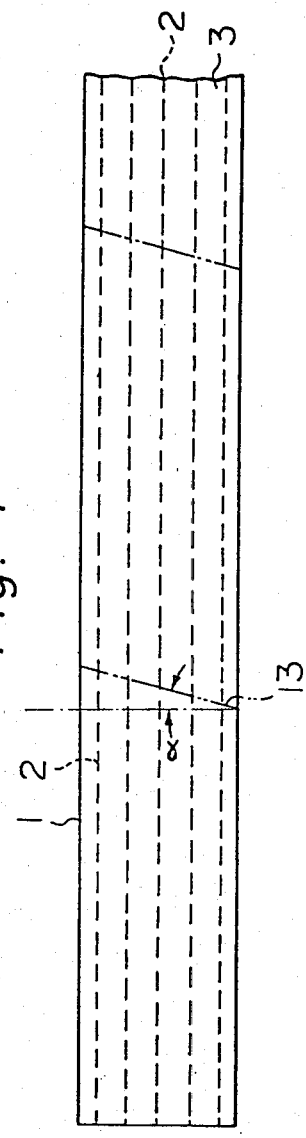
FIGS. 1 and 2 are top plan and cross-sectional views, respectively, illustrating a part of an example of a long web used for the preparation of the electrical heating element material according to the present invention.

The electrical heating element material of the present invention can be prepared in a discontinuous or continuous manner by two relatively simple steps, that is, a step of forming a thermoplastic resin web including a plurality of metal conductor wires arranged therein in parallel to one another and a step of folding this web in succession at predetermined intervals to form a two-layer essentially rectangular sheet. Accordingly, the electrical heating element material of the present invention is stable in its characteristics, and can be manufactured very easily.

Since the electrical heating element material of the present invention has an essentially rectangular sheet-like shape as a whole, if this electrical heating element material is used, a heat-shrinkable cover can be prepared very easily by inserting this sheet-shaped heating element material between layers of a heat-shrinkable synthetic resin member and laminating the assembly together.

In the electrical heating element material of the present invention, since the web including a plurality of metal conductor wires arranged therein in parallel to one another is folded in succession along folded lines at a small acute angle to the transverse direction of the web to form a two-layer essentially rectangular sheet and a plurality of the wires are arranged in a net-like pattern, the metal conductor wires are densely distributed uniformly over the entire region of the rectangular sheet. Therefore, uniform heating can be attained when an electric current is passed through this heating element material.

In the electrical heating element material of the present invention, there is not present any conductor wire aligned along either of the side edges of the heating element material, i.e., along the direction of the folding lines in the web, and only conductor wires arranged in a net-like pattern are included. Therefore, the electrical heating element material can be stretched and contracted upon heating in the direction of the folding lines. Furthermore, since the heat-shrinkable synthetic resin member including the electrical heating element material inserted between at least two layers of the synthetic resin member is subjected to lamination in the state where the direction of the folding lines in the side edges, i.e., the electrical heating element material is substantially in agreement with the direction of heat shrinkage of the heat-shrinkable synthetic resin member, the heat shrinkability of the resulting heat-shrinkable cover is not degraded by the presence of the electrical heating element material.

Moreover, since the electrical heating element of the present invention is formed of a thermoplastic synthetic resin, including a plurality of metal conductor wires. The insulated metal conductor wires are completely covered and insulated by the synthetic resin. Accordingly, even if two adjacent wires arranged in parallel to each other are brought very close to each other in the web, or even when the web is folded so that the wires arranged in parallel to each other form a net-like pattern, short circuits or breakages of the metal conductor wires are not caused. Furthermore, even if one conductor wire is broken at a certain point, a sufficient heating effect can be attained by other conductor wires.

Since the electrical heating element of the present invention is an essentially two-layer rectangle-like sheet formed of the web of a thermoplastic synthetic resin including a plurality of metal conductor wires, when the heating element material is inserted between at least two layers of the heat-shrinkable synthetic resin member and the assembly is subjected to lamination, the entire assembly is integrally fusion-bonded very smoothly and a heat-shrinkable cover having no voids in the interior thereof can be prepared.

The electrical heating element material of the present invention, the process for the preparation thereof and the heat-shrinkable cover including this electrical heating element material therein will now be described in detail with reference to the accompanying drawings.

Figure 2:
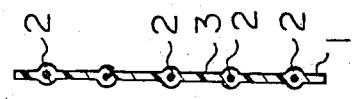

Referring to FIGS. 1 and 2, illustrating one example of a long web used for the manufacture of the electrical heating element material of the present invention, a rectangular web 1 is formed of a synthetic resin and it includes therein a plurality of metal conductor wires 2 arranged in parallel to one another along the longitudinal direction of the web 1. Any flexible and soft metallic materials which generate heat under application of electricity, that is, electrically resistant metallic materials, can be used for the metal conductor wires 2. Single wires or twisted wires having a fine diameter, which are formed of copper, a copper alloy or a nichrome alloy, are preferably used as the metal conductor wires. In the case of copper wires, it is preferred that the diameter be 0.01 to 1.0 mm, especially 0.1 to 0.6 mm, and the sectional area be 0.0001 to 0.8 mm$^2$, especially 0.001 to 0.3 mm$^2$. The sectional shape of the metal conductor wires need not be absolutely circular.

Any of the thermoplastic resins may be used for formation of the web 1. For example, there can be mentioned polyethylene, polypropylene, polyvinyl chloride, polyesters and polyamides. After the web has been formed from such material, the web may be irradiated with electron radiation or other radiation or chemically treated with a cross-linking agent, such as a peroxide compound, to effect cross-linking. It is preferable that the degree of cross-linking be such that the degree of gel fraction does not exceed 70%, and more preferably, the degree of gel fraction is in the range of the gelation percentage from about 35% to about 65%. A heat resistance, i.e., the property of preventing flow and/or deformation at high temperature, can be imparted to the synthetic resin shaped article by this cross-linking.

By the term "degree of gel fraction" used herein is meant a weight percent of a residual sample based on the weight of the initial sample, as measured when 0.15 g of the initial sample is dipped in 30 ml of xylene, at 120° C., for 24 hours, and then, the sample is maintained at 80° C. for more than 16 hours to remove xylene therefrom.

The web 1 includes therein a plurality of metal conductor wires 2 arranged in parallel to one another along the longitudinal direction of the web 1. It is preferable that the distance between every two adjacent parallel metal conductor wires in the web be 0.3 to 2 cm, more preferably 0.5 to 1 cm. If this distance is too large, a uniform heating effect cannot be obtained and a sufficient quantity of heat cannot be obtained. On the other hand, if the distance is too small, since adjacent metal conductor wires are brought very close to each other and sometimes into contact with each other at the heat-shrinkage step, short circuits of the metal conductor wires are sometimes encountered.

Suitable width of the web 1 varies depending upon the particular size of the heat-shrinkable cover and thus upon the particular size of a pipe joint to be covered with the heat-shrinkable cover. For example, when the web is used for the electrical heating element material to be included in a heat-shrinkable cover for a pipe joint having a diameter of about 60 inches (about 152.4 cm), the width of the web may conveniently be about 5 to about 30 cm. When the web is used for the electrical heating element material to be included in a heat-shrinkable cover for a pipe joing having a diameter of about 30 inches (about 76.2 cm), it is convenient that the width is about 3 to about 15 cm. Furthermore, when the web is used for the electrical heating element material to be included in a heat-shrinkable cover for a pipe joint having a diameter of 12 inches (about 30.5 cm), it is convenient that the width of the web is about 1.0 to about 5 cm.

It is preferable that the thickness of a synthetic resin portion 3 (FIG. 1) or 2 of the web 1 is 10 to 500 microns, more preferably about 20 to about 300 microns and that the thickness of the synthetic resin coating the metal conductor wire 2 in the web 1 to be 10 to 200 microns, more preferably about 20 to about 100 microns.

Figure 3:
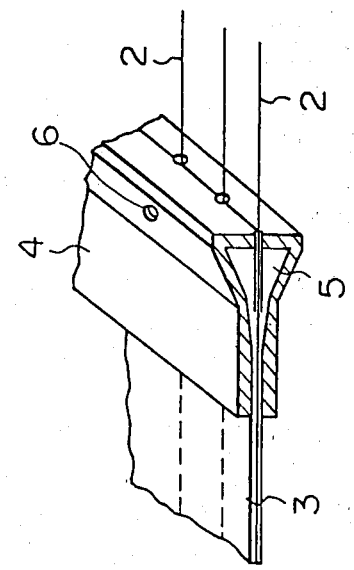
FIG. 3 is a schematic diagram illustrating the state where this web is being prepared by an extrusion process using a cross-head type extrusion die.

The above-mentioned web can be prepared according to various methods. For example, the web may be prepared by an extrusion process using a cross-head type die 4 for extrusion as illustrated in FIG. 3. In this regard, referring to FIG. 3, a plurality of metal conductor wires 2 arranged in parallel to one another are supplied from the rear of the die 4, and separately, a molten thermoplastic resin is supplied into a cavity 5 of the die 4 from a feed inlet 6. The thermoplastic resin is co-extruded together with the metal conductor wires in the form of a web and cooled to form a web including the metal conductor wires therein. According to this method, a long web including metal conductor wires arranged therein in parallel to one another along the longitudinal direction thereof can be advantageously prepared in a continuous manner with a stable quality being guaranteed.

Referring to FIG. 4, the electrical heating element 11 of the present invention comprises the above-mentioned rectangular web 1, which is folded in succession at predetermined intervals along folding lines 13 inclined at a small acute angle (see FIG. 1) to the transverse direction of the web 1, to form a substantially two-layer parallelogrammatic sheet. This sheet-shaped electrical heating element 11 comprising the two-layer web can be used as it is, but in such case, there is a risk of the sheet opening while it is being handled. Accordingly, it is preferable that the two layers of the web be partially or entirely bonded together. For example, the two layers of the sheet-shaped electrical heating element 11 are thermally press-bonded directly or through a hot-melt adhesive layer (for example, a heat sealer) to form an integral laminate.

The folding lines 13 of the web 1 become the two side edges of the sheet-shaped electrical heating element 11, and it is preferable that the direction of the folded lines 13 be inclined at an acute angle of 0.5° to 10°, more preferably 1° to 8°, to the transverse direction of the web, i.e., the direction perpendicular to the longitudinal direction of the web. If the inclination angle of the folding lines is too large with respect to the transverse direction of the web, the heat shrinkability of a heat-shrinkable cover formed by including this electrical heating element material in a heat-shrinkable synthetic resin member is degraded.

As pointed out hereinbefore, the folding lines 13 of the web become two side edges 14 and 15 parallel to each other. Each segment 13' of the folding lines forming side edges of the two-layer sheet may overlap with the adjacent segments at either of the two and portions thereof. However, the length of each overlapped portion should preferably be less than one cm, more preferably less than 0.5 cm. Furthermore, each segment 13 of the folding lines forming side edges of the two-layer sheet may be separated from the adjacent segments. However, the distance between the two adjacent segments should preferably be less than one cm, more preferably less than 0.5 cm. It is most preferable that each segment 13' of the folding lines be contiguous to the adjacent segments without any substantial space therebetween, as illustrated in FIG. 4. If the adjacent segments of the folding lines overlap each other with an overlapping length of more than one cm or they are separated from each other by a distance of more than one cm, a uniform heating effect cannot be obtained by the resulting electrical heating element material.

The electrical heating element 11 of the present invention has electricity-applying terminals 9 on both ends of the folded web, to which the respective metal conductor wires are connected. Generally, it is preferable that a pair of the terminals 9 be fitted on both end portions of the folded web having the metal conductor wires, as illustrated in FIG. 4. However, a plurality of terminals may be formed in intermediate portions in addition to the terminals 9 located in both end portions, if necessary. These terminals may be arranged on one of the two side edges i.e., the folding lines of the folded web) of the electrical heating element material, or the paired terminals may be arranged on opposite side edge lines, respectively.

The electrical heating element material of the present invention can be prepared by folding the web in succession at predetermined intervals along folding lines inclined at an acute angle to the transverse direction of the web to form a substantially two-layer parallelogrammatic sheet and, optionally, bonding the two layers of the sheet to each other to form an integral laminate.

As the method for folding the synthetic resin web, there can be mentioned, for example, a method in which the web is spirally wound tightly and closely on a strip of plate having a certain width, the plate is then removed and the two layers of the folded web are laminated by heat bonding under pressure, and a method in which the web is folded in succession at predetermined intervals in a zigzag manner so that every two adjacent folding lines are contiguous to each other and the two layers of the folded web are laminated by heat bonding under pressure. This heat bonding under pressure is carried out only for retaining the rectangular sheet-like shape of the folded electrical heating element material. Care should be taken that conductor wires do not intersect one another and cause short circuits because of insufficient insulation. A hot melt adhesive or the like may be used for bonding, if desired.

In the electrical heating element of the present invention, the metal conductor wires included in the heating element material are arranged at an acute angle to the direction perpendicular to the direction of the two side edges of the heating element material, i.e., the direction of the folding lines in the web, as illustrated in FIG. 4. Accordingly, stretching or contraction of the electrical heating element material included in the heat-shrinkable cover is allowed in the direction of the side edges (the direction of the folding lines) at the step of heating the heat shrinkable cover. If the direction of the side edges of the heating element is made substantially in agreement with the direction of heat shrinkage of the heat-shrinkable cover, the heat shrinkability of the cover is not degraded at all because of the presence of the included heating element material.

Furthermore, in the electrical heating element of the present invention, since the metal conductor wires included and arranged in parallel to one another cross one another at a great number of points to form a net-like pattern as illustrated in FIG. 4, a uniform heating effect can be attained.

Moreover, since an electric current can be supplied in parallel through these metal conductor wires arranged in parallel to one another, a large quantity of heat can be generated, and even if wire breakage takes place in one conductor wire, heating can be accomplished by the other conductor wires.

In the heat-shrinkable cover of the present invention, the above-mentioned electrical heating element is included substantially over the entire region of the heat-shrinkable synthetic resin member so that the direction of the side edges of the folded web of the heating element is substantially in agreement with the direction of heat shrinkage of the heat-shrinkable synthetic resin member.

As the heat-shrinkable synthetic resin member, there may be employed a film or sheet material of a crystalline synthetic resin having a heat-shrinkability, or a laminate formed of a plurality of such film or sheet materials. In order to improve the heat resistance, it is preferable that the film or sheet material be cross-linked by electron radiation, or other radiation so that the degree of gel fraction is 20 to 80%, more preferably 30 to 70%. As the crystalline synthetic resin, there can be mentioned, for example, polyethylene, polypropylene, polyvinyl chloride and polyamides.

The heat-shrinkable film or sheet material can be prepared by shaping a crystalline synthetic resin such as mentioned above into a film or sheet, uniaxially stretching the film or sheet at a high temperature (higher than 100° C.) and cooling the film or sheet in the stretched state to ambient temperatures. The cross-linking may be carried out before or after the stretching. The so-prepared material exhibits a heat shrinkability along the stretching direction, and this stretching direction corresponds substantially to the direction of heat shrinkage.

A heat-shrinkable synthetic resin member prepared by shaping a film or sheet from polyethylene, cross-linking and stretching the polyethylene film and laminating a plurality, especially 2 to 20, of such films or sheets of cross-linked polyethylene is preferably used for the preparation of the heat-shrinkable cover of the present invention.

The heat-shrinkable cover of the present invention can be prepared by inserting the electrical heating element 11 between at least two layers 16 and 17 and laminated together for formation of the heat-shrinkable synthetic resin member 10, so that the heating element material is disposed in a predetermined direction, and heat-bonding the assembly under pressure to form a laminate structure.

More specifically, as the method for preparing the heat-shrinkable cover of the present invention, there can be mentioned a method in which the above-mentioned synthetic resin material of a film or sheet form is wound on a drum in 2 to 10 layers, especially 2 to 6 layers, the electrically heating element material is wound on the layers of the film or sheet so that the direction of the folding lines of the heating element material is substantially in agreement with the direction of heat shrinkage of the film or sheet, 2 to 15 layers, especially 2 to 10 layers, of the film or sheet are further wound on the heating element material, a release paper or the like is wound on the outermost layer of the film or sheet and the entire assembly is heated to effect lamination while the ends of the wound assembly are clamped together, whereby there can be formed a heat-shrinkable cover comprising a heat-shrinkable synthetic resin member having the heating element material included in the interior thereof. The heat-shrinkable cover prepared according to this method has a tubular shape 12 as illustrated in FIG. 6. When this tubular product is cut between the terminals 9 in FIG. 6, along the direction parallel to the rotation axis of the drum, a flat sheet-shaped heat-shrinkable cover can be obtained. In the above-mentioned preparation method, if a release paper is interposed in a portion corresponding to the above-mentioned cutting portion at the step of winding the electrical heating element material, by cutting the tubular heat-shrinkable cover at the release paper-attached portion, a sheet-like heat-shrinkable cover 10 having both ends including branched tongue-like pieces as illustrated in FIG. 5 can be prepared. This heat-shrinkable cover having such tongue-like pieces on both ends is preferred because, when the cover is wound on the joint of a steel pipe, both ends of the cover can be advantageously connected by meshing the tongue-like pieces with each other.

As another method for preparing the heat-shrinkable cover of the present invention, there can be mentioned a method in which 2 to 10, especially 2 to 6, rectangular films or sheets of the heat-shrinkable material, which are the same in the size, are superposed on a flat plate, the electrical heating element material of the present invention is superposed on the films or sheets so that the direction of the folding lines is substantially in agreement with the direction of heat shrinkage in the films or sheets, films or sheets of the heat-shrinkable material are further superposed on the heating element material and the assembly is laminated together by heating while a pressing force is applied to the entire surface of the assembly in such a manner that the heat shrinkability of the heat-shrinkable material is not lost. According to this preparation method, a flat sheet-shaped heat-shrinkable cover can be directly obtained. If a release paper is interposed between the layers of the heat-shrinkable material as in the above-mentioned method using the winding drum, a heat-shrinkable cover 10 having tongue-like pieces on both ends as illustrated in FIG. 5 can be obtained.

As still another method for the preparation of the heat-shrinkable cover of the present invention, there can be mentioned a method in which 2 to 20 films, especially 2 to 10 films, of a heat-shrinkable resin material are superposed upon each other and laminated together to form a heat-shrinkable synthetic resin material, two sheets of such laminated films are prepared, the electrical heating element material is inserted between the two sheets and the assembly is heated under pressing to form a laminate structure.

The size of the heat-shrinkable cover of the present invention can be determined appropriately according to the diameter of the joint of a steel pipe or electric cable to be covered, but it is preferable that the thickness of the cover be 0.5 to 5 mm, more preferably about 1 to about 3 mm.

Since the heat-shrinkable cover of the present invention includes therein an electrical heating element material having metal conductor wires arranged in a net-like pattern, it is excellent from the point of view that shrinkage under heating can be accomplished very conveniently and advantageously. Accordingly, even if a pipeline is constructed under severe climatic conditions, for example, in cold temperatures or when there is a strong wind, a uniform heating effect can be attained by winding the heat-shrinkable cover of the present invention around the periphery of the joint of a steel pipeline and passing an electric current through the electrical heating element material included in the heat-shrinkable cover.

The present invention will now be further clarified by the following Examples.

EXAMPLE 1

Eight copper wires, each having a diameter of 0.26 mm, were supplied to a cross-head type die of an extruder having a screw diameter of 30 mm while they were arranged in parallel to one another at intervals of 7.8 mm. Separately, high-pressure polyethylene, containing 2.6% by weight of carbon black, and having a density of 0.935 and a melt index (MI) of 0.12, was supplied to the extruder. The polyethylene was coextruded from the cross-head type die, at an extrusion temperature of about 220° C., together with the copper wires. The extrudate was dipped in a water bath maintained at ambient temperature to prepare a web having a width of 6.2 cm and including therein 8 copper wires arranged in parallel to one another. Thereafter, the web was irradiated with electron rays until the degree of gel fraction reached about 50%.

The web was folded 60 times in succession and the folded web was bonded under heating to obtain an electrical heating element material having a parallelogrammatic sheet shape 600 mm in width and 187 cm in length. In this electrical heating element material, the direction of the folding lines in the web was inclined at an angle of 3.12° to the transverse direction of the web. Considering the small angle, the sheet could be considered, for practical purposes, to be rectangular. The respective segments of the folding lines were close to one another so that the distance between two adjacent segments was not larger than 1 mm.

Terminals were attached to all of the eight copper wires at both end portions of the web, respectively.

Eight films of polyethylene (having a gelation percentage of 48% and a heat shrinkability of 40%) having a thickness of 0.15 mm, a width of 600 mm and a length of 186 mm were placed below the heating element material, and eight of the same polyethylene films were placed above the heating element material. The assembly was heated at 175° C., for 45 minutes, under pressing, to fusion-bond the respective layers and effect lamination, whereby a heat-shrinkable cover was obtained.

The heat-shrinkable cover was wound around the periphery of a steel pipe point having a diameter of 50 cm, and the terminals were connected to an alternating current power source of a constant voltage of 110 V and an electric current was passed through the electrical heating element material in an ambient temperature of 20° C., to effect heat shrinkage. The heat shrinkage was accomplished within about 3 minutes and an anti-corrosive cover uniformly and closely adhered to the periphery of the joint of the steel pipe was obtained.

EXAMPLE 2

A web having a width of 12.5 cm and including 16 copper wires 0.26 mm in diameter, which were arranged in parallel to one another at intervals of 7.8 mm, was prepared by extrusion and electron radiation curing in the same manner as described in Example 1. The web was folded in succession 80 times, and an electrical heating element material having a width of 850 mm and a length of 499 cm was prepared in the same mannter as described in Example 1.

By using this heating element material, a heat-shrinkable cover was prepared in the same manner as described in Example 1, except that films of polyethylene (having a gelation percentage of 48% and a heat shrinkability of 40%) having a thickness of 0.15 cm, a width of 850 mm and a length of 499 cm were used. The so-obtained heat-shrinkable cover was wound on the periphery of a steel pipe joint having a diameter of 155 cm, and an alternating current of 160 V was supplied to the terminals of the cover in an ambient temperature of 20° C. to effect heat shrinkage. The heat shrinkage was accomplished within about 6 minutes, and an anti-corrosive cover adhering uniformly and closely to the periphery of the joint of the steel pipe was formed.

We claim:

1. A heat-shrinkable cover comprising a heat-shrinkable synthetic resin member and an electrical heating element combined with the heat-shrinkable synthetic resin member substantially over the entire region thereof, wherein the electrical heating element comprises a web of a synthetic resin having a plurality of flexible metal conductor wires arranged therein in parallel to one another along the longitudinal direction of the web, said web being folded in succession at predetermined intervals along folding lines inclined at a small acute angle to the transverse direction of the web to form a two-layer rectangular sheet, and the direction of the folding lines forming the side edges of the two-layer rectangular sheet of the electrical heating element is substantially in agreement with the direction of heat shrinkage of the heat-shrinkable synthetic resin member.

2. A heat-shrinkable cover according to claim 1, wherein the heat-shrinkable synthetic resin member is comprised of 2 to 20 films or sheets superposed upon another, each being an uniaxially drawn film or sheet of a crystalline synthetic resin.

3. A heat-shrinkable cover according to claim 1 or 2, wherein the synthetic resin of the heat-shrinkable member is cross-linked to such an extent that the degree of gel fraction is in the range of from about 20% to about 80%.

4. A heat-shrinkable cover according to claim 1 or 2, wherein the heat-shrinkable cover has such a laminate structure that the electrical heating element is sandwiched between the layers of uniaxially stretched films or sheets of a crystalline synthetic resin.

5. A heat-shrinkable cover according to claim 4, wherein both end portions of the laminate structure are interlayer-separated to form branched tongue-like portions.

6. A heat-shrinkable cover according to claim 1 or 2, wherein the two layers of the rectangular sheet are bonded together.

7. A heat-shrinkable cover according to claim 1 or 2, wherein a pair of terminals are fitted on both end portions of the folded web having the metal conductor wires.

8. A heat-shrinkable cover according to claim 1 or 2, wherein the heat-shrinkable cover has a thickness of from 0.5 to 5 mm.

9. A heat-shrinkable cover according to claim 1 or 2, wherein each of the metal conductor wires has a sectional area of from 0.0001 to 0.8 mm$^2$ and the distance between every two adjacent parallel metal conductor wires in the web is from 0.3 to 2 cm.

10. A heat-shrinkable cover according to claim 1 or 2, wherein the synthetic resin of the web has a thickness of from 10 to 500 microns at the portions where no metal conductor wires exist and a thickness of from 10 to 200 microns at the portions where the metal conductor wires are coated with the synthetic resin.

11. A heat-shrinkable cover according to claim 1 or 2, wherein the folding lines are inclined at an acute angle of 0.5° to 10° to the transverse direction of the web.

12. A heat-shrinkable cover according to claim 1 or 2, wherein each segment of the folding lines forming the side edges of the two-layer rectangular sheet neither overlaps with the adjacent segments at either of the two end portions thereof over a length of more than one centimeter, nor is separated from the adjacent segments at a distance of more than one centimeter.

13. A heat-shrinkable cover according to claim 1 or 2, wherein the synthetic resin for the web is cross-linked to such an extent that the degree of gel fraction is in the range of from about 35% to about 65%.

* * * * *